No. 714,612. Patented Nov. 25, 1902.
J. E. Y. ROCHESTER.
BALL BEARING.
(Application filed Apr. 8, 1899.)
(No Model.)
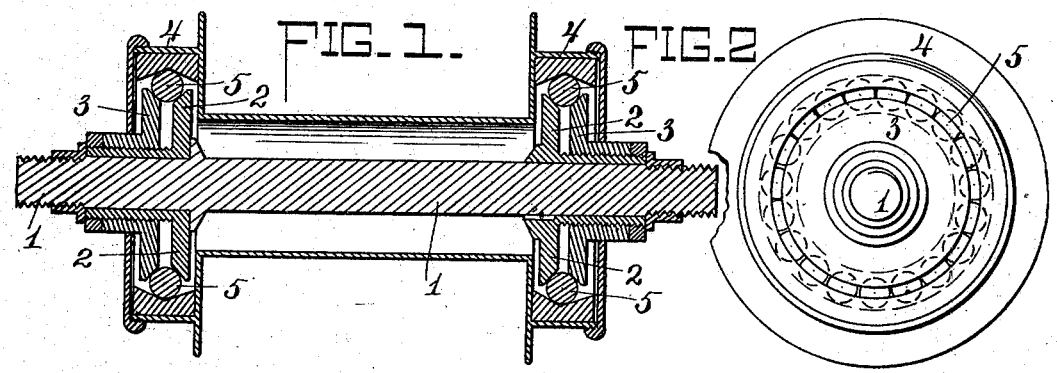
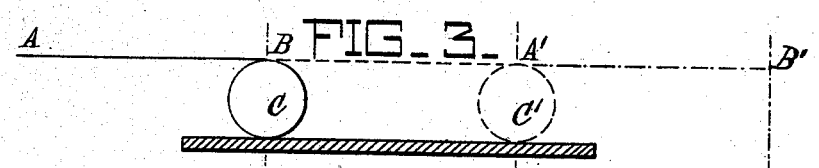
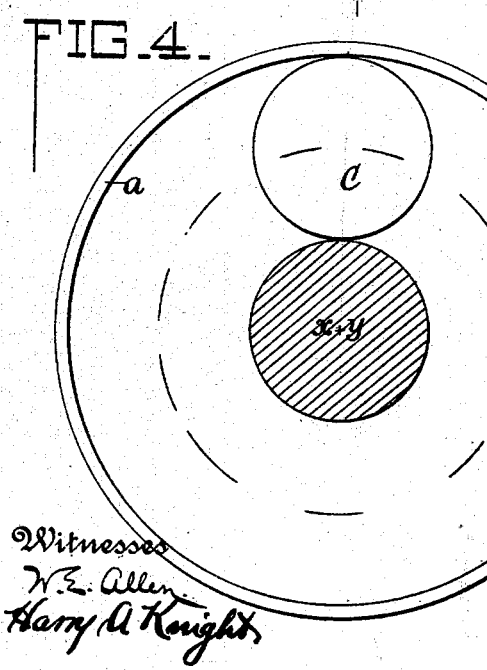
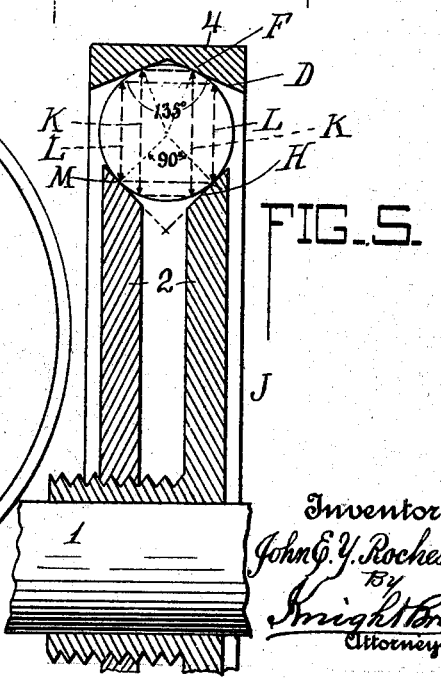
Witnesses
W. E. Allen
Harry A. Knight
Inventor
John E. Y. Rochester.
By
Knight Bros
Attorneys

UNITED STATES PATENT OFFICE.

JOHN E. Y. ROCHESTER, OF OTTAWA, CANADA.

BALL-BEARING.

SPECIFICATION forming part of Letters Patent No. 714,612, dated November 25, 1902.

Application filed April 8, 1899. Serial No. 712,300. (No model.)

*To all whom it may concern:*

Be it known that I, JOHN E. Y. ROCHESTER, a subject of the Queen of Great Britain, and a resident of Ottawa, in the Province of Ontario, Dominion of Canada, have invented certain new and useful Improvements in Ball-Bearings, of which the following is a specification.

My invention relates to antifriction-bearings of the four-point-ball type—that is to say, the type in which balls are made to run in angularly-grooved bearing in the two members between which relative rotation takes place. It is well known that in this type of bearing the balls are easily locked against movement, which shows that a true rolling movement does not exist.

The object of my invention is to eliminate that portion of the resistance offered by such antifriction-bearings, while permitting the employment of balls of such size and grooves of such angles as may be desirable from other considerations. Having selected the diameter of balls desired and the angles suitable for bearings for such balls, I attain my object by selecting such diameters for the relatively rotating parts as will establish a certain relation between the diameter of the circle of trackage of the balls upon the fixed member and the circle of trackage of said balls upon the rotating member. With my construction I have found by actual experiment that unless a great amount of power is applied it is impossible to lock the balls against movement.

My invention will be understood upon reference to the accompanying drawings, forming part of this specification, and in which—

Figures 1 and 2 are respectively an axial section and an end view without the dust-cap of a ball-bearing embodying the principle of my invention. Figs. 3 and 4 are diagrams illustrating, respectively, the effect of a plane and of a cylindrical surface traveling over a fixed surface with an intervening circular antifriction member. Fig. 5 is a diagram illustrating the method of obtaining the proper proportions between the diameters of the inner and outer members with a given size of balls and given angle of bearing-grooves.

My invention aims to so construct the parts that the balls will measure off on their own periphery a distance exactly equal to that which they measure off on the surfaces of the members between which they are placed, under which conditions there is a pure rolling action. If the members between which the balls are placed were plane surfaces, as illustrated in Fig. 3, when the roller C made one turn it has measured off on the moving surface A B the same distance as on the base or fixed surface. A B travels not only the distance of the circumference of the roller C, but also the distance through which the latter's center of revolution has advanced in a straight line, or from C to C' as well. It has been carried a certain distance and been propelled a certain distance, or a total distance of from A to A'. The carrying movement is identical with the propelling movement. This produces a true rolling movement, which offers the least resistance to the movement of a body. In ordinary ball-bearings this condition cannot be fulfilled, because the bearing-surfaces are circles, one of which is larger than the other. The ball's progression is in an angular direction, and the member farther from the center necessarily travels farther than the inner member. Thus, as illustrated in Fig. 4, if the circular shell $a$ is traveling on the roller C about the fixed circular member of axle X Y, the diameters of C and X Y being, for purposes of illustration, equal, one revolution of the roller C on the axle X Y would tend to carry the roller completely around the axle, or an angular distance of three hundred and sixty degrees; but one revolution of C will cause $a$ to travel an angular distance of four hundred and eighty degrees, or an angular distance measured by the arc corresponding to the circumference of C measured off on $a$ together with the angular distance traveled by C or $x\,y$. $a$ has thus been carried through three hundred and sixty degrees and propelled through one hundred and twenty degrees. This falls short of accomplishing a true rolling movement, because the angular travel over both surfaces is not equal. It is therefore necessary to vary one of these movements so as to make it equal to the other.

In practice it is sometimes desirable to use balls of certain standard sizes and to construct the bearing-grooves of an angle not less than ninety degrees to avoid a binding effect on the ball, and yet to employ an angle that is not too great in order that the balls may prevent lateral play of the relatively rotating members. For these reasons the size of balls and the angles of the grooved bearings may be regarded as fixed or known elements for any given work.

1 represents an axle; 2, the fixed member, one part 3 of which is detachable for assembling the parts, and 4 is the traveling member. The fixed and traveling members have angular bearing peripheries, each of which bears upon the antifriction member 5 at two points. The diameter of the balls and the angles of these bearing peripheries being selected, it is necessary to establish such a ratio between the circles of trackage of the traveling member upon the antifriction member and of the latter upon the fixed member that both the carrying and propelling movement of the rotating member, and consequently the angular movement of the balls, will be equal, and thus fulfil the object of the invention.

If the angle of the groove H in the fixed member is selected as ninety degrees and a size ball be selected in which the radius J of the circles of trackage in the shell will be 7.524 times the cosine of the angle of twenty two and one-half degrees, with the radius of the ball used as a base, then the two sides of the groove D in the shell will include an angle of one hundred and thirty-five degrees, and the ball will rotate as often on its diameters K, bearing on the points F in the shell, as its shorter diameters L will rotate on the diameter M of the bearing-points of the cones 2, and the carrying and propelling actions of the balls will be equal, and a true rolling movement is obtained.

Having thus described my invention, what I claim as new therein, and desire to secure by Letters Patent, is—

A bearing, comprising angularly-grooved fixed and rotating members, and interposed antifriction-balls, the angles of the grooves of the fixed and rotating members being such that both faces of the groove of each member impinge the balls in small circles of the same diameter, and the circles formed by one member bear the same relation to the circles formed by the other member that the tracks of the fixed and movable members bear to each other.

JOHN E. Y. ROCHESTER.

Witnesses:
   HERVEY S. KNIGHT,
   HARRY A. KNIGHT.